(12) United States Patent
Kang et al.

(10) Patent No.: US 7,787,424 B2
(45) Date of Patent: Aug. 31, 2010

(54) SYSTEM AND METHOD OF ROUTING IN A ROUTER IN A COMMUNICATION SYSTEM

(75) Inventors: Kyung-lim Kang, Suwon-si (KR); Jae-hoon Kim, Seoul (KR); Jung-ho Kim, Suwon-si (KR); Yong-sung Roh, Icheon-si (KR); Young-gon Choi, Suwon-si (KR); Shubhranshu Singh, Yongin-si (KR); Jeong-sik In, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 693 days.

(21) Appl. No.: 11/169,784

(22) Filed: Jun. 30, 2005

(65) Prior Publication Data
US 2006/0002354 A1 Jan. 5, 2006

(30) Foreign Application Priority Data
Jul. 3, 2004 (KR) .................... 10-2004-0051780

(51) Int. Cl.
*H04W 88/08* (2009.01)
(52) U.S. Cl. .................. 370/338; 370/331
(58) Field of Classification Search ............ 370/338, 370/390, 312, 254, 331, 258
See application file for complete search history.

(56) References Cited

U.S. PATENT DOCUMENTS

| | | | |
|---|---|---|---|
| 7,177,295 B1 * | 2/2007 | Sholander et al. ........... 370/338 |
| 2004/0233882 A1 * | 11/2004 | Park et al. ................. 370/338 |
| 2005/0041627 A1 * | 2/2005 | Duggi ....................... 370/338 |
| 2005/0286419 A1 * | 12/2005 | Joshi et al. ................ 370/230 |
| 2008/0137580 A1 * | 6/2008 | Axelsson et al. ........... 370/315 |

FOREIGN PATENT DOCUMENTS

CN 1471776 1/2004

(Continued)

OTHER PUBLICATIONS

Official Action (issued Apr. 20, 2006) with respect to Korean Patent Application No. 2004-51780 filed on Jul. 3, 2004.

(Continued)

Primary Examiner—George Eng
Assistant Examiner—Khawar Iqbal
(74) Attorney, Agent, or Firm—Staas & Halsey LLP (57) ABSTRACT

A method for relaying packets through a relay node in a communication system composed of a source node, a destination node and at least one relay node for transferring the packets transmitted from the source node to the destination node. The relay node compares a potential corresponding to a number of hops and constituting the transferred packets with a stored potential from the destination node. If the stored potential is smaller than the potential constituting the packets, the relay node updates the packet and broadcasts the updated packets. Also, according to a method for setting a route for transmitting packets, packets are broadcast and it is checked whether updated packets obtained by updating the broadcast packets are received. If updated packets are received, an address of a packet transmission node constituting the updated packets is stored and the following packets are transmitted to the node having the stored address.

23 Claims, 4 Drawing Sheets

FOREIGN PATENT DOCUMENTS

| | | |
|---|---|---|
| CN | 1471776 A | 1/2004 |
| KR | 2001-0042878 | 5/2001 |
| KR | 1020010042878 | 5/2001 |
| KR | 10-2004-0048528 | 6/2004 |
| KR | 10-2004004852 | 6/2004 |

OTHER PUBLICATIONS

Chinese Office Action for corresponding Chinese Patent Application No.: 2005100821589 dated Dec. 28, 2010 (4 pgs).
Korean Office Action for corresponding Korean Patent Application No.: 10-2004-0051780 dated Apr. 20, 2006 (2 pgs).

* cited by examiner

SYSTEM AND METHOD OF ROUTING IN A ROUTER IN A COMMUNICATION SYSTEM

CROSS-REFERENCE TO RELATED APPLICATION

This application claims the benefit of Korean Patent Application No. 2004-51780, filed on Jul. 3, 2004, the disclosure of which is incorporated herein by reference.

BACKGROUND OF THE INVENTION

1. Field of the Invention

The present invention relates generally to an ad-hoc network. More particularly, embodiments of the present invention relate to a system and method for setting a route among nodes that constitute an ad-hoc network.

2. Description of the Related Art

Generally, a mobile communication system transmits/receives data between a mobile terminal and a base station. That is, the mobile terminal and the base station directly transmit/receive data to/from each other without passing data through other nodes. However, an ad-hoc network uses other nodes when it transmits data from a source node to a destination node.

In order to transfer data (packets) to the destination node in an ad-hoc network, the source node first sets a route. A route is a path through which the data packets are transmitted. Using the set route, the source node transmits the data to the destination node. However, the nodes that constitute the ad-hoc network guarantee the network's mobility. Accordingly, if any of the nodes moves, the route should be set again. The term "constitute" as it is used throughout this disclosure is intended to be open ended. Accordingly, the ad-hoc network may include additional components. Hereinafter, methods for setting a route in an ad-hoc network will be explained.

A method for setting a route may be classified as a proactive method or a reactive method. According to a proactive method, every node that constitutes the ad-hoc network stores a routing table. Accordingly, if packets to be transmitted are generated, the node transmits the packets without delay using the routing table. Meanwhile, the respective node has routing information of other nodes that constitute the ad-hoc network, thus if one node moves, all nodes update their routing tables by transmitting/receiving control information. Additionally, as the number of nodes that constitute the ad-hoc network increases, both the size of the routing tables and the amount of control information being transmitted/received increase abruptly.

The reactive method is a method for setting a route only when needed. Specifically, a node that does not presently take part in packet transmission does not have a routing table, and does not generate control information even if it moves. However, if packets to be transmitted are generated, a route for transmitting the packets should be set. Accordingly, it takes a lot of time to transmit the generated packets. Additionally, as the number of generated packets increases, i.e., as the amount of control information for setting the route increases, the load of the ad-hoc network also increases. Accordingly, a scheme for rapidly transferring the generated packets with mobility of nodes guaranteed is required.

SUMMARY OF THE INVENTION

The present invention has been developed in order to solve the above drawbacks and other problems associated with the conventional arrangement.

An aspect of the present invention provides a method and system that can minimize the size of a routing table stored in a respective node.

Another aspect of the present invention provides a method and system that can rapidly transfer generated packets to a destination node.

Still another aspect of the present invention provides a method and system that can minimize the amount of control information (i.e., control signals) transmitted/received for setting a route.

In accordance with an aspect of the present invention, there is provided a method for relaying packets through a relay node in a communication system including a source node, a destination node and at least one relay node for transferring packets transmitted from the source node to the destination node. The method includes comparing a potential corresponding to a number of hops and constituting the transferred packets with a stored potential from the destination node, updating the packets if the stored potential is smaller than the potential constituting the packets, and broadcasting the updated packets.

In accordance with another aspect of the present invention, there is provided a method for setting a route that will transmit packets through a relay node in a communication system including a source node, a destination node and at least one relay node for transferring packets transmitted from the source node to the destination node The method includes broadcasting packets and checking whether updated packets obtained by updating the broadcast packets are received, storing an address of a packet transmission node constituting the updated packets if the updated packets are received, and transmitting following packets to the node having the stored address.

In accordance with still another aspect of the present invention, there is provided a communication system, including a source node to broadcast generated packets, and at least one relay node to compare a potential corresponding to a number of hops and constituting transferred packets with a stored potential from a destination node, and to update the packets if the stored potential is smaller than the potential constituting the packets to broadcast updated packets, wherein the destination node receives the packets from the relay node.

In accordance with still another aspect of the present invention, there is provided a system for setting a route that will transmit packets in a communication system including a source node, a destination node and at least one relay node for transferring packets transmitted from the source node to the destination node. The system includes a first node to store an address of a packet transmission node constituting updated packets obtained by updating broadcast packets if the updated packets are received, and to transmit following packets to the node having the stored address, and a second node to update the received packets and broadcast the updated packets.

Additional aspects and/or advantages of the invention will be set forth in part in the description which follows and, in part, will be apparent from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present invention, examples of which are illustrated in the accompanying drawings, wherein like reference numerals refer to the like elements throughout. The embodiments are described below to explain the present invention by referring to the figures.

An embodiment of the present invention proposes a scheme for storing a potential table, the size of which is smaller than a routing table in a node. Additionally, an embodiment of the present invention proposes a scheme for setting a route and transmitting packets using the potential table.

Figure 1:
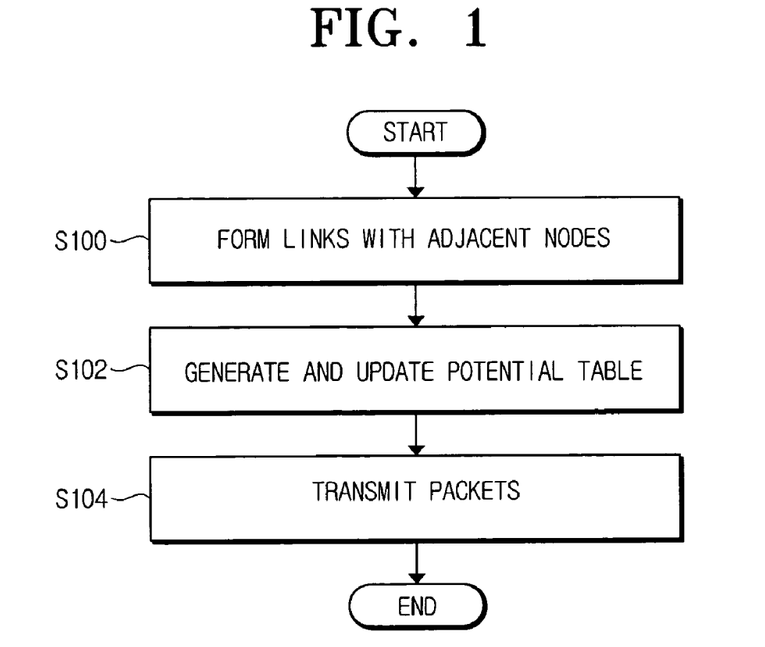
FIG. 1 is a flowchart of a process of setting a route among nodes that constitute an ad-hoc network according to an embodiment of the present invention.

FIG. 1 is a flowchart of a process of setting a route among nodes in an ad-hoc network according to an embodiment of the present invention. In operation S100, nodes that constitute the ad-hoc network form links with adjacent nodes. In operation S102, the respective nodes generate/update potential tables by transmitting/receiving potential table information to/from the adjacent nodes using the formed links. In operation S104, the nodes of the ad-hoc network transmit packets to a destination node using the potential tables. Hereinafter, the above-described processes will be explained in order.

Figure 2:
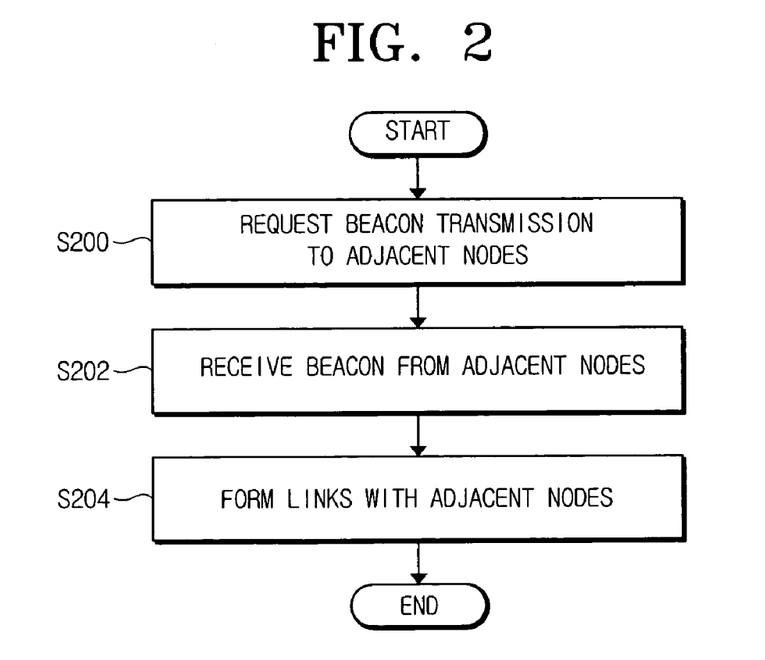
FIG. 2 is a flowchart of a process of forming a link among nodes that constitute an ad-hoc network according to an embodiment of the present invention.

FIG. 2 is a flowchart of a process of forming a link among nodes that constitute an ad-hoc network according to an embodiment of the present invention. For example, the process of forming links in a node that enters into the ad-hoc network will be explained.

In operation S200, a node that has entered into the ad-hoc network requests beacon transmission to adjacent nodes. Specifically, the node requests beacon transmission to the adjacent nodes by transmitting a packet that includes an identifier of the node itself. In operation S202, the adjacent nodes that have received the request for the beacon transmission transmit beacons to the node. The beacon includes only simple information in its header part. Specifically, the beacon includes an identifier of the node that transmits the beacon and an identifier of the node that will receive the beacon. In operation S204, the node forms links with the adjacent nodes that have transmitted the beacons by analyzing the received beacons. Generally, the node forms the links with the adjacent nodes located within one hop from the node. The nodes that constitute the ad-hoc network form the links in the following cases:

1. If a new node enters into the ad-hoc network, or if an initial booting occurs,
2. If a transmission error occurs in the packet transmitted using the set route, and
3. At predetermined intervals for updating the formed links.

Generally, in cases 1 and 2, the links are always formed, but in case 3, the links may or may not be formed in accordance with a user's setting. Also, the predetermined intervals may be adjusted in accordance with the user's setting.

The node that has formed the links using the received beacons transmits/receives potential tables to/from the adjacent nodes. The node that has entered into the ad-hoc network generates the potential table, and the node that constitutes the ad-hoc network updates the potential table. Table 1 below shows an example of the potential table.

TABLE 1

| Destination Node Address | Potential | Sequence Number |
|---|---|---|
| 12 | 5 | 150 |
| 26 | 13 | 141 |
| . | . | . |
| . | . | . |
| . | . | . |
| 31 | 7 | 97 |

The potential table proposed in an embodiment of the present invention has a size smaller than a routing table. Specifically, the potential table includes a destination node address, a potential and a sequence number. That is, the routing table includes information about a node (i.e., next node) that will transmit the packets, but the potential table excludes the node information. Hereinafter, information stored in the potential table is called potential information, which means the number of hops. The sequence number indicates the sequence number of the information generated by the destination node, and the destination node information can be updated using the sequence number. That is, the sequence number corresponds to the update of the information generated by the destination node, and using this sequence number, the destination node information is updated.

Figure 3:
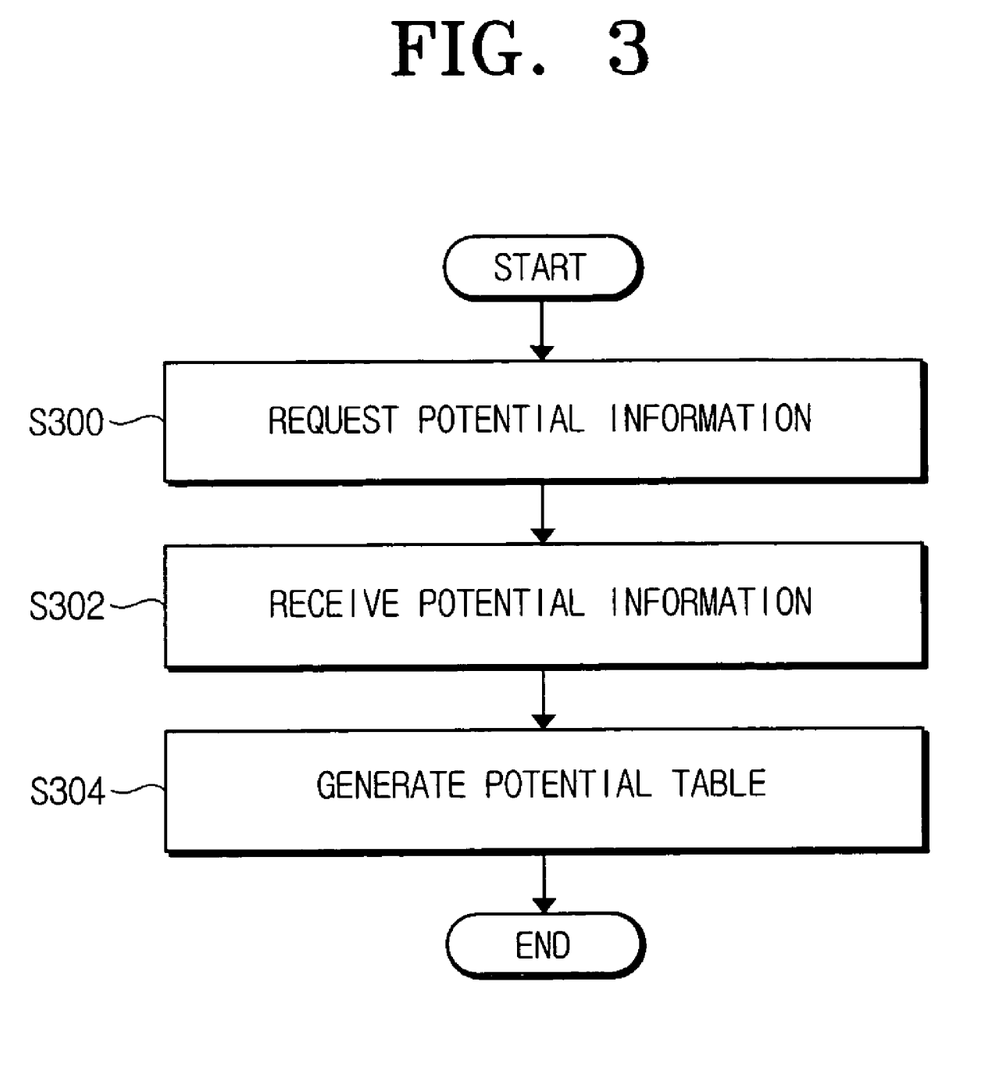
FIG. 3 is a flowchart of a process of generating a potential table in a node constituting an ad-hoc network according to an embodiment of the present invention.

FIG. 3 is a flowchart of a process of generating a potential table in a node constituting an ad-hoc network according to an embodiment of the present invention. In the process, a node that has formed links requests potential information stored in adjacent nodes, and generates a potential table using the received information.

In operation S300, the node that has formed the links with the adjacent nodes requests the potential information to the adjacent nodes, and in operation S302, the node receives the potential information transmitted by the adjacent nodes. In operation S304, the node generates the potential table using the received potential information.

The potential table is generated 1) when the node requests the potential information to the adjacent nodes and receives the potential information from the adjacent nodes, and 2) when the adjacent node requests the potential table.

The node requests the potential information to the adjacent nodes linked with the node. As described above, the adjacent nodes that have received the request transmit the stored potential information to the node.

Now, the transmission/reception of the potential information will be explained in more detail. If the node that constitutes the ad-hoc network senses a change of topology, i.e., if the node receives a beacon from a new node or the existing adjacent node does not respond to the beacon request, it requests the update of the potential information to the adjacent nodes. In this case, the node that has sensed the change of the topology generates a new packet the sequence number of which is increased by 1, and transmits the generated packet to the adjacent nodes. The respective adjacent node updates the potential information by comparing the sequence number of the received packet with the sequence number stored therein.

By performing the above-described process, the potential information about the node (i.e., destination node) that has sensed the change of topology is updated. Additionally, the respective node that has updated the potential information requests the update of the potential information to the adjacent nodes.

In addition, the node that constitutes the ad-hoc network can periodically transmit/receive the potential information.

Figure 4:
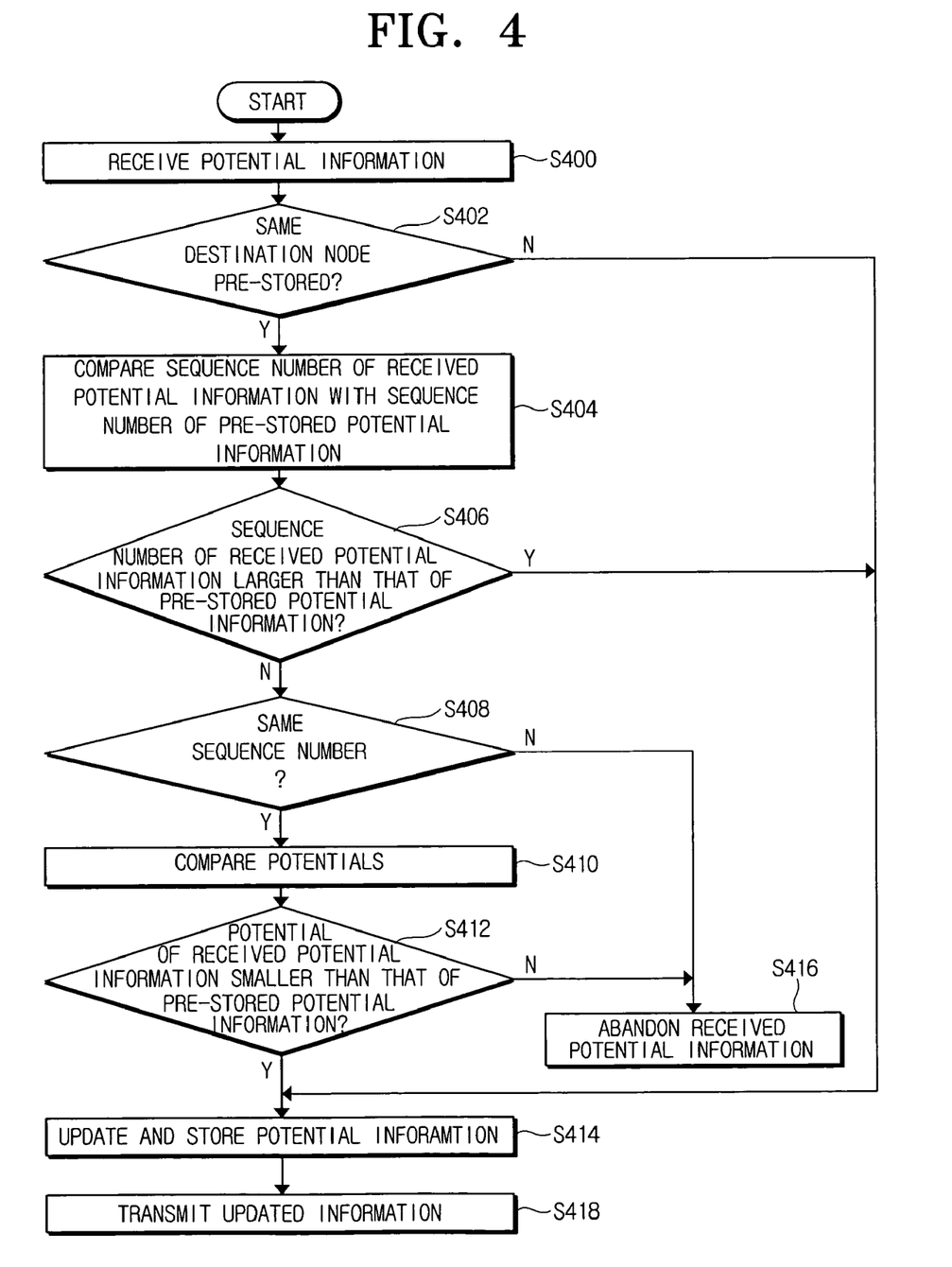
FIG. 4 is a flowchart of a process of updating potential information in a node constituting an ad-hoc network according to an embodiment of the present invention.

FIG. 4 is a flowchart of a process of generating or updating potential information. The process of generating the potential table will be explained in more detail with reference to FIG. 4.

In operation S400, the node receives the potential information from the adjacent nodes. The respective adjacent node transmits all information stored in the potential table to the node. That is, information about a plurality of destination nodes is transmitted to the node. In FIG. 4, however, a case is exemplified in which information about one destination node is received.

In operation S402, the node extracts a destination node address from the received potential information, and judges whether the extracted destination node address is pre-stored in the node. If the extracted destination node address is pre-stored as a result of judgment, the node proceeds to operation S404, while if not, it proceeds to operation S414.

In operation S404, the node compares the sequence number of the received potential information with the sequence number of the corresponding potential information pre-stored therein. In operation S406, if the sequence number of the received potential information is larger than the sequence number of the pre-stored potential information, the node proceeds to operation S414, while if not, it proceeds to operation S408.

At operation S408, if the sequence number of the received potential information is the same as the sequence number of the pre-stored potential information, the node proceeds to operation S410, while if not, i.e., if the sequence number of the received potential information is smaller than the sequence number of the pre-stored potential information, it proceeds to operation S416.

In operation S410, the node compares the potential of the received potential information with the potential of the pre-stored corresponding potential information. In operation S412, if the potential of the received potential information is smaller than the potential of the pre-stored potential information, the node proceeds to operation S414, while if not, it proceeds to operation S416. In operation S416, the node discards the received potential information.

In operation S414, the node updates and stores the received potential information. Specifically, it increases the potential of the received potential information by 1, and keeps the same sequence number. In operation S418, the node transmits the updated potential information to the adjacent nodes.

Figure 5:
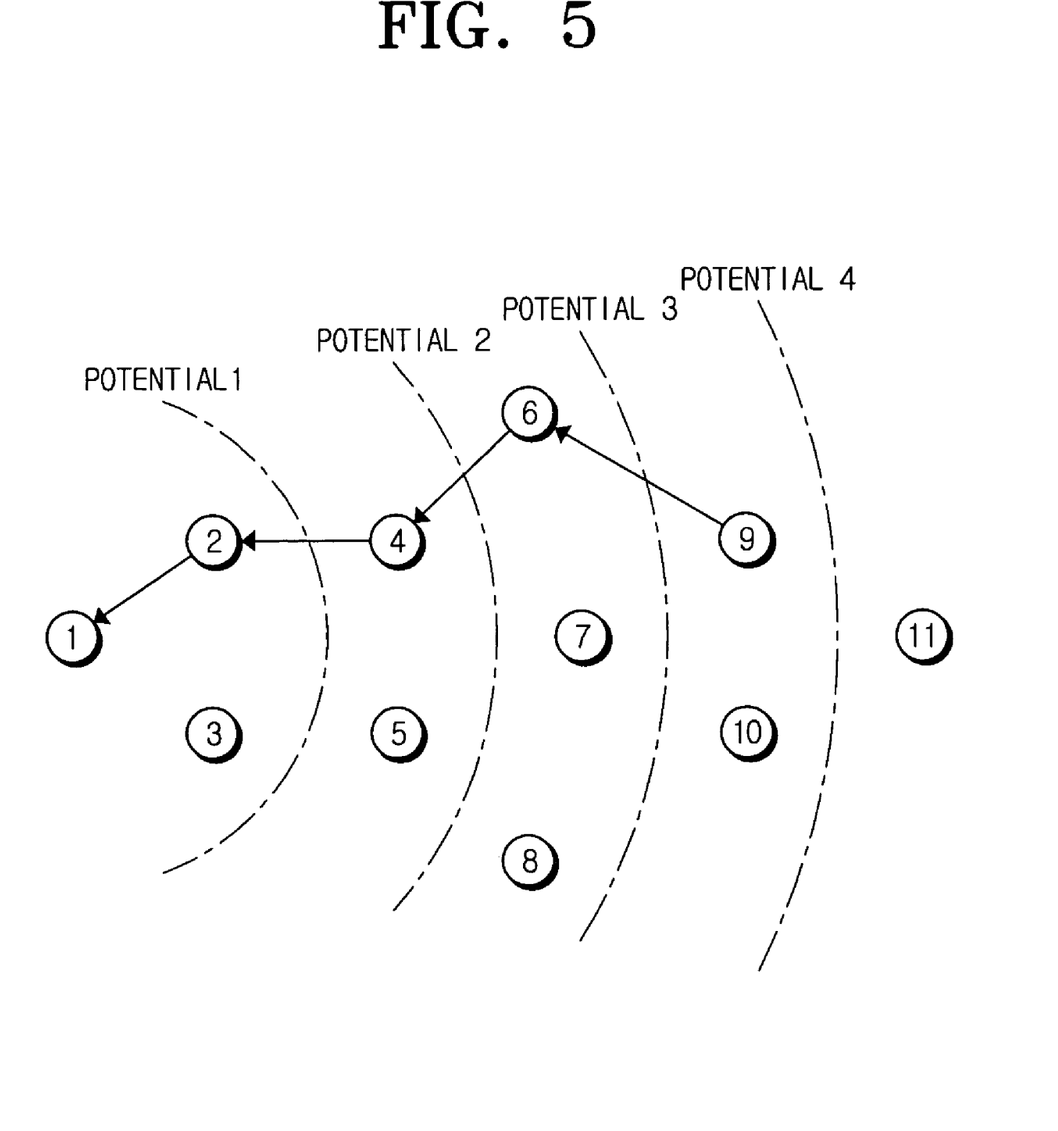
FIG. 5 is a schematic representation of a process of transmitting packets from a source node to a destination node according to an embodiment of the present invention.

Hereinafter, with reference to FIG. 5, the process of transmitting packets from a source node to a destination node will be explained. In FIG. 5, nodes 1 to 11 are illustrated. It is assumed that node 1 is a destination node and node 9 is a source node. Also, it is assumed that the nodes except for the source node and the destination node are relay nodes. That is, nodes 2 to 8 and node 10 are relay nodes. The respective nodes store potentials from the destination node. The potential of nodes 2 and 3 is '1', and the potential of nodes 4 and 5 is '2'. The potential of nodes 6 to 8 is '3', the potential of nodes 9 and 10 is '4', and the potential of node 11 is '5'.

The node 9 broadcasts a packet that includes a header to the adjacent nodes. In order to minimize the power consumption, node 9 can adjust the transmission power so that only the nodes located within one hop can receive the packet. The header includes addresses of the source node and the destination node, the sequence number for the potential and the destination node, and an identifier of the packet. Referring to FIG. 5, the potential of the packet transmitted by node 9 is '4'.

The packet broadcast from node 9 is received by nodes 6 to 8, 10 and 11. The node that has received the broadcast packet compares the sequence number included in the packet with the sequence number of the corresponding destination node stored therein. If the sequence number stored therein is smaller than the sequence number of the received packet, it means that the information about the destination node is not updated. Accordingly, the node discards the received packet. In FIG. 5, a case is exemplified in which the sequence number of the received packet is the same as the stored sequence number.

If the sequence numbers are the same, the node compares the potential of the received packet with the potential of the stored destination node. If the potential of the received packet is the same as the potential of the stored destination node, as a result of comparison, the node discards the received packet. That is, nodes 10 and 11 discard the received packet.

Nodes 6 to 8 update the received packet and then broadcast the updated packet to the adjacent nodes. The updating process is classified into a process of reducing the potential that constitutes the header part of the received packet by '1' and a process of adding its own address. Specifically, the nodes 6 to 8 correct the potential to '3', and broadcast the corrected packet. However, the nodes having the same potential, which have received the updated packet, discard the packet received from the node 9. Through the above-described process, only one of the nodes having the same potential transmits the received packet to the adjacent nodes.

For example, node 6 receives the packet transmitted from the node 9, updates the received packet, and broadcasts the updated packet. The packet broadcast from node 6 is received by nodes 4, 5, and 7 to 10. In this case, nodes 7 and 8 having the same potential as node 6 discard the packet transferred from node 9. Nodes 7 and 8 recognize the same packet using the addresses of the source node and the destination node and the packet identifier of the received packet. Node 9 can recognize that the packet transmitted by node 9 has been transferred to node 6 without an error by receiving the packet broadcast from node 6, and temporarily stores the information about node 6 and the information about the destination node in a cache.

If nodes 6 and 7 update and broadcast the packet transmitted by node 9, node 9 stores information about one of the nodes 6 and 7 in the cache. In this case, node 9 can store the information of the node that first transmitted the packet to the node 9.

By repeatedly performing the above-described processes, the packet broadcast from node 9 is transferred to node 1, which is the destination node.

If a packet to be transferred to node 1 is generated, node 9 transfers the packet to node 6 using the information stored in the cache. Generally, the node divides the data to be transferred into two packets and transfers the two packets rather than transferring the data as one packet. Accordingly, the second packet and the following packets are transferred using a route generated as the first packet is transmitted. The information stored in the cache is deleted when a predetermined time elapses.

Hereinafter, a process performed in the event that a transmission error occurs during the transmission of the packet from the source node to the destination node will be explained. First, a process performed in the event that a transmission error occurs during the transmission of the first packet will be explained.

The packet broadcast from node 6 is received by nodes 4 and 5. If node 6 receives the updated packet from node 4 or 5, it recognizes that no error occurred during the transmission of the packet. However, if the updated packet is not received from node 4 or 5, it judges that an error occurred during the transmission of the packet. In this case, node 6 requests the potential information about the destination node (i.e., node 1) to the adjacent nodes. If the potential information is received from the adjacent nodes, node 6 updates the potential table using the received information. Node 6 then retransmits the packet using the updated potential information. In the retransmission process, node 6 does not generate the cache. However, if node 6 recognizes that the error occurred in the source node (i.e., node 9) during the transmission of the packet, it generates the cache through the retransmission process.

If the second packet transmitted from the same source node to the destination node is received, node 6 performs the same process as that illustrated in FIG. 5. Additionally, node 6 generates the cache using the second packet.

Next, a process performed in the case that a transmission error occurs during the transmission of the second packet will be explained. It is assumed that as illustrated in FIG. 5, the router is set through node 9, node 6, node 4, node 2 and node 1 in order using the first packet.

Node 4 broadcasts the second packet. If node 6 does not receive the packet broadcast from node 4, it recognizes that an error occurred during the transmission of the packet. In this case, node 6 requests the potential information about node 1 to the adjacent nodes. Node 6 compares the potential of the received potential information with the potential of the node 1.

If the potentials are not the same as a result of comparison, node 6 retransmits the packet using the received potential information. However, node 6 does not generate a cache through the retransmission process. In this case, since the potential of node 4 is changed, node 6 judges whether the potential of node 2 is also changed by requesting the potential information of node 2 to node 4. Node 6 then sets the route again by performing the same process as the process of transmitting the first packet.

Meanwhile, if the potentials are the same as a result of comparison, the node determines that an error occurred in node 4 or that node 4 escaped from the transmission range of node 6. Accordingly, node 6 performs the same process as the process of transmitting the first packet.

As described above, according to embodiments of the present invention, a respective node can minimize the amount of control information for supporting mobility of the nodes by managing potential information without managing routing information. Additionally, the load of the nodes that constitute the ad-hoc network can be minimized by setting the route using the transfer of a first packet without performing a separate route setting process.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method for relaying packets through a relay node in a communication system comprising a source node, a destination node and at least one relay node to transfer packets transmitted from the source node to the destination node, the method comprising:

comparing a potential table received from an adjacent node with a stored potential table from the destination node, the received potential table including a potential corresponding to a number of hops from the destination node, an address of the destination node and a sequence number, while the received potential table excludes routing information of a next node, wherein the next node is a node that will relay the packets and that is located on a route between the source node and the destination node;

updating the packets when a sequence number of the received potential table is the same as a sequence number of the stored potential table and a received potential is smaller than a stored potential, or when a sequence number of the received potential table is larger than the sequence number of the stored potential table, and otherwise discarding the packets;

broadcasting the updated packets; and repeating the comparing, the updating and the broadcasting until the destination node receives the packets transmitted from the source node, wherein the sequence number indicates the sequence number of the information generated by the destination node, and the destination node information can be updated using the sequence number.

2. The method as claimed in claim 1, wherein the respective nodes that constitute the communication system store information about potentials among the nodes.

3. The method as claimed in claim 1, wherein the potential table further comprises an address of the source node.

4. The method as claimed in claim 1, wherein if the potential of the received potential table is not smaller than a potential of the stored potential table, the received packet is abandoned.

5. The method as claimed in claim 1, wherein the updating increases a value of a received potential by '1'.

6. A method for setting a route that will transmit packets through a relay node in a communication system comprising a source node, a destination node and at least one relay node to transfer packets transmitted from the source node to the destination node, the method comprising:

broadcasting packets and checking whether updated packets obtained by updating the broadcast packets are received;

storing an address of a packet transmission node constituting the updated packets if the updated packets are received; and transmitting following packets to the node having the stored address, wherein the packets comprise an address of the source node, an address of the destination node, the address of the packet transmission node and a potential corresponding to a number of hops from the destination node, while the packets exclude routing information of a next node, the next node being a node that will relay the packets and that is located on a route between the source node and the destination node;

wherein the packets are updated when a sequence number of a received potential table is the same as a sequence number of the stored potential table and a received potential is smaller than a stored potential or when a sequence number of the received potential table is larger than the sequence number of the stored potential table, and the packets are otherwise discarded.

7. The method as claimed in claim 6, wherein at least one of the updated packets is a packet comprising a potential obtained by reducing a potential that constitutes at least one of the broadcast packets by '1'.

8. The method as claimed in claim 7, wherein if at least two updated packets are received, the address of the packet transmission node that constitutes a first received packet is stored.

9. The method as claimed in claim 6, further comprising:
requesting and receiving a potential up to the destination node from adjacent nodes if the updated packets are not received; and
updating at least one of the packets using the received potential and retransmitting the updated packet.

10. A method of a node for setting a route for transmitting packets in an ad-hoc network, comprising:
forming links with adjacent nodes;
generating or updating potential tables by transmitting or receiving potential table information to or from the adjacent nodes using the formed links, the potential table information including a potential corresponding to a number of hops from a destination node, an address of the destination node and a sequence number, while the potential table information excludes routing information of a next node, wherein the next node is a node that will relay the packets and that is located on a route between a source node and the destination node; and
transmitting the packets using the potential tables,
wherein the updating updates the packets when a sequence number of a received potential table is the same as a sequence number of the stored potential table and a received potential is smaller than a stored potential, or when a sequence number of the received potential table is larger than the sequence number of the stored potential table, the packets otherwise being discarded,
wherein the sequence number indicates the sequence number of the information generate by the destination node, and the destination node information can be updated using the sequence number.

11. The method of claim 10, wherein the forming of links comprises forming links with adjacent nodes located within one hop from the node.

12. The method of claim 10, wherein the potential tables are smaller than routing tables.

13. The method of claim 10, wherein the potential tables comprise potential information comprising a number of hops from a source node to a destination node.

14. The method of claim 10, wherein the generating and/or updating of the potential tables occurs upon a sensed change of network topology.

15. A communication system, comprising:
a source node to broadcast generated packets; and
at least one relay node to compare a potential table received from an adjacent node with a stored potential table from a destination node, the received potential table including a potential corresponding to a number of hops from the destination node, an address of the destination node and a sequence number, while the received potential table excludes routing information of a next node, the next node being a node that will relay the packets and that is located on a route between the source node and the destination node, and the at least one relay node to update the packets when a sequence number of the received potential table is the same as a sequence number of the stored potential table and a received potential is smaller than a stored potential, or when a sequence number of the received potential table is larger than the sequence number of the stored potential table, the packets otherwise being discarded,
wherein the relay node then broadcasts the updated packets and repeats the comparing, the updating and the broadcasting until the destination node receives the packets transmitted from the source node, and
wherein the sequence number indicates the sequence number of the information generated by the destination node, and the destination node information can be updated using the sequence number.

16. The system as claimed in claim 15, wherein the nodes that constitute the communication system store information about potentials among the nodes.

17. The system as claimed in claim 15, wherein the potential table further comprises an address of the source node, an address of the destination node, and an address of the at least one relay node.

18. The system as claimed in claim 15, wherein if the potential of the received potential table is not smaller than a potential of the stored potential table, the relay node abandons the received packet.

19. The system as claimed in claim 15, wherein the relay node reduces the potential that constitutes at least one of the transferred packets by '1' and broadcasts the packet.

20. A system for setting a route that will transmit packets in a communication system comprising a source node, a destination node and at least one relay node to transfer packets transmitted from the source node to the destination node, the system comprising:
a first node to store an address of a packet transmission node constituting updated packets obtained by updating broadcast packets if the updated packets are received, and to transmit following packets to the node having the stored address; and
a second node to update the received packets and broadcast the updated packets, wherein the packets comprise an address of the source node, an address of the destination node, the address of the packet transmission node and a potential corresponding to a number of hops from the destination node, while the packets exclude routing information of a next node, wherein the next node is a node that will relay the packets and that is located on a route between the source node and the destination node,
wherein the first node determines that the updated packets are received when a sequence number of a received potential table is the same as a sequence number of the stored potential table and a received potential is smaller than a stored potential or when a sequence number of the received potential table is larger than the sequence number of the stored potential table, the packets otherwise being discarded.

21. The system as claimed in claim 20, wherein the second node updates at least one of the packets so that the updated packet has a potential obtained by increasing a value of a received potential by '1'.

22. The system as claimed in claim 20, wherein if at least two updated packets are received, the first node stores the address of the packet transmission node that constitutes a first received packet.

23. The system as claimed in claim 20, wherein the first node requests and receives a potential up to the destination node from adjacent nodes if an updated packet is not received, and updates at least one of the packets using the received potential, and retransmits the updated packet.

* * * * *